United States Patent [19]
Bulkeley

[11] Patent Number: 5,461,936
[45] Date of Patent: Oct. 31, 1995

[54] MOTORCYCLE CONTROL LEVER CONNECTOR

[76] Inventor: Guy V. O. Bulkeley, Box 67007 Bryanston, Johannesburg, South Africa, 2021

[21] Appl. No.: 327,442

[22] Filed: Oct. 21, 1994

Related U.S. Application Data

[63] Continuation of Ser. No. 999,116, Apr. 1, 1993, abandoned.
[51] Int. Cl.[6] .................................................. G05G 11/00
[52] U.S. Cl. ............................. 74/489; 74/502.2; 74/488
[58] Field of Search .......................... 74/489, 488, 502.2, 74/505, 506; 267/150

[56] References Cited

U.S. PATENT DOCUMENTS

| 627,227 | 6/1899 | Fenton | 74/551.9 |
|---|---|---|---|
| 864,056 | 8/1907 | Altenburger | 74/551.9 |
| 2,776,579 | 1/1957 | Nichel | 74/488 |
| 3,218,879 | 11/1965 | Reed | 74/489 |
| 3,601,395 | 8/1971 | Morgan | 272/73 |
| 4,286,699 | 9/1981 | Pawelka | 74/489 |
| 4,352,303 | 10/1982 | Christner | 74/505 X |
| 4,461,189 | 7/1984 | Rottenkolber | 74/506 X |
| 4,619,154 | 10/1986 | Yamanaka | 74/506 |
| 4,799,668 | 1/1989 | Jansen | 74/551.9 |
| 4,848,502 | 7/1989 | Kikuta et al. | 74/489 X |
| 4,972,733 | 11/1990 | Olmr | 74/551.9 |
| 5,005,674 | 4/1991 | Piatt | 74/489 |
| 5,134,897 | 8/1992 | Romano | 74/502.2 X |

FOREIGN PATENT DOCUMENTS

| 113856 | 2/1929 | Austria | 74/489 |
|---|---|---|---|
| 215842 | 11/1960 | Austria | 74/489 |
| 931552 | 2/1948 | France | 74/489 |
| 811325 | 8/1951 | Germany | 74/489 |
| 44-18334 | 7/1969 | Japan | 74/489 |
| 48-33174 | 8/1973 | Japan | 74/502.2 |
| 750478 | 6/1956 | United Kingdom | 74/502.2 |
| 92/14645 | 9/1992 | WIPO | 74/489 |

*Primary Examiner*—Vinh T. Luong
*Attorney, Agent, or Firm*—Thomas I. Rozsa; Tony D. Chen

[57] ABSTRACT

A combination of a control lever connector and a motorcycle having a hand control lever and a handlebar. The connector includes a split mounting bracket having a tubular portion surrounding the handlebar, where the control lever is attached to the bracket. The connector also includes a pair of complementary circumferential clamping members clamped around the handlebar, where at least one of the clamping members has an arcuate internal semi-circular groove. A lug is extending radially from one end of the bracket; and, and there is at least one compressible member placed within the groove between the lug and one end of the groove, where the compressible member is operable to return the mounting bracket to its initial position when the control lever is released.

8 Claims, 3 Drawing Sheets

MOTORCYCLE CONTROL LEVER CONNECTOR

This is continuation of application Ser. No. 17/999,116 filed on Apr. 1, 1993, now abandoned.

BACKGROUND OF THE INVENTION

(1) Field of the Invention

The present invention relates generally to a control lever connector for motorcycles or the like and, more particularly, to a connector so constructed as to allow the control lever to pivot relative to the handgrip around its longitudinal axis in response to rotational forces, thus relieving the rider's arms from the strain of activities such as jumping and riding over bumps.

(2) Description of the Prior Art

Motorcross racing is a highly competitive sport in which seemingly minor advantages can make the difference between winning and losing. One critical area has to do with the ergometric relationship of the rider and the bike. Over the years, a variety of handlebar and grip designs have been tried. However, the general design has evolved to the point that a control lever is mounted forward (when the rider is seated on the motorcycle) adjacent each handlebar. During operation, the rider's hands tend to surround both the grip and the associated hand lever. Prior to the present invention, it was not fully appreciated that rigid, non-rotatable mounting of the control levers could significantly affect the balance and response of the rider, particularly in such activities as jumping and riding over bumps.

U.S. Pat. No. 864,056, issued to Altenburger, discloses a grooved handlebar for a bicycle or the like. The handlebar is designed to yield vertically under pressure, thus relieving the rider's arm for the strain or jar incident to a rigid bar. The handlebar includes a fixed member and a clamping sleeve for engaging with the fixed member. The end walls of the sleeve are provided with slots and a movable tubular member having a swinging connection with the sleeves. A spring arrangement located within the movable tubular member returns the tubular member back to its initial position. However, there is no provision for axial movement of the handgrip portion of the bar.

U.S. Pat. No. 627,227 issued to Fenton teaches an improved bicycle handlebar also designed to take up or neutralize the jarring vibration to the rider though the usually rigid handlebar from the frame of the bike due to riding over rough surfaces. The invention, as taught by Fenton, includes means which allow a permissive sliding motion of the grasping handles relative to the ends of the handlebars proper on which they are mounted and against resilient devices within the hollow handlebars device which operates to take up vibration. However, like the Altenburger patent, there is no provision for axial rotation.

U.S. Pat. No. 2,776,579, issued to Nickel, discloses a handgrip of the type mounted from the handle of an outboard motor engine or the like for the purpose of controlling the speed of the engine. The grip, as taught by Nickel, is so designed as to automatically return to its starting position should the grip be released, thereby cutting down engine speed to a minimum under the circumstances. In the preferred embodiment, the Nickel handgrip includes a shaft rotatably received by a tubular shaft. A coil spring is slidably received by the shaft of the handgrip and has one end attached thereto. The other end of the coiled spring is attached to the shaft receiving the grip. As a result, rotation of the handgrip causes the spring to tighten and exert a force thereagainst. Upon release of the handgrip, the spring unwinds and returns the grip to its starting position. However, there is no teaching or suggestion in Nickel that such a device could be adapted for use with control levers, motorcycles or the like to perform an ergometric function.

U.S. Pat. No. 3,601,395, issued to Morgan, discloses a stationary exercising bike having handlebars which have an adjustable friction-type clamping device which offers resistance to the manual rotation of the handlebars during an exercise program. The handgrip portions are coaxially arranged and are offset from and substantially parallel to the transverse portion of the handlebar. Suitable handgrip sleeves are rotatably carried on each handgrip portion and secured against displacement by bolt screwed in to the end of the grip. This arrangement permits the grips to turn as the handlebar is rotated about its axis. However, there is no teaching or suggestion by Morgan of any means to limit the bidirectional axial rotation of the handgrip with respect to the free end of the handlebar or to return the handgrip to its initial position when released.

U.S. Pat. No. 4,799,668, issued to Jansen, describes a handlebar exercising device in which the handlebar grip may be rotated bidirectionally about its longitudinal axis. There is no teaching, however, of the rotational movement of the control levers.

Thus, there remains a need for a new and improved technique for connecting the control levers of motorcycles or the like to the handlebars which is operable to provide partial bidirectional axial rotation of the control levers with respect to the free end of the handlebars while, at the same time, to return the handgrip to its initial position when released This arrangement allows the rider to be more comfortable and obviates changes in his grip. For example, when a rider stands and leans forward as in jumping and riding over bumps, he does not have to let go of the grip and regrip as the position of his arm changes. It also allows for exercise of the fingers and hands on long trips.

SUMMARY OF THE INVENTION

The present invention is directed to an improved control lever connector for use on motorcycles or the like and especially motorcross type motorcycles. The connector is so designed as to permit limited bidirectional rotational movement of the control lever about the axis of the handlebar and to automatically return the control lever to an initial starting position.

In the preferred embodiment, the connector includes a pair of complementary circumferential clamping members which, when clamped together, surround one of the handlebars. A control lever mounting bracket is received for rotation within the clamping member. The other end of the bracket is connected to the control lever. The central portion of at least one of the pair of complementary circumferential clamping members is grooved to receive a pair of opposed nylon "springs" and a lug extending radially from the bracket. Thus, rotation of the control lever in one direction causes the lug to compress one of the pair of springs by releasing the preload against the other of the springs. Conversely, rotation in the opposite direction compresses the other of the springs while releasing the first. As a result, the connector permits reciprocal movement of the control lever(s) about the axis of the handlebar(s) over a limited range during activities such as jumping while, at the same time, returning the control lever to its initial position when the rotational force is removed.

It is therefore an object of the present invention to mount one or both of the control levers for a motorcycle with respect to the handlebar that the control lever(s) are permitted limited rotational movement of the control levers responsive to normal stresses on the hands and arms of the driver which occur as the motorcycle is driven.

It is another object of the present invention to provide an ergonomically designed control lever attachment for motorcycle handlebars.

These and other objects of the present invention will become apparent to those skilled in the art after a reading of the following description of the preferred embodiment when considered with the drawings.

DETAILED DESCRIPTION OF THE PREFERRED EMBODIMENTS

Figure 1:
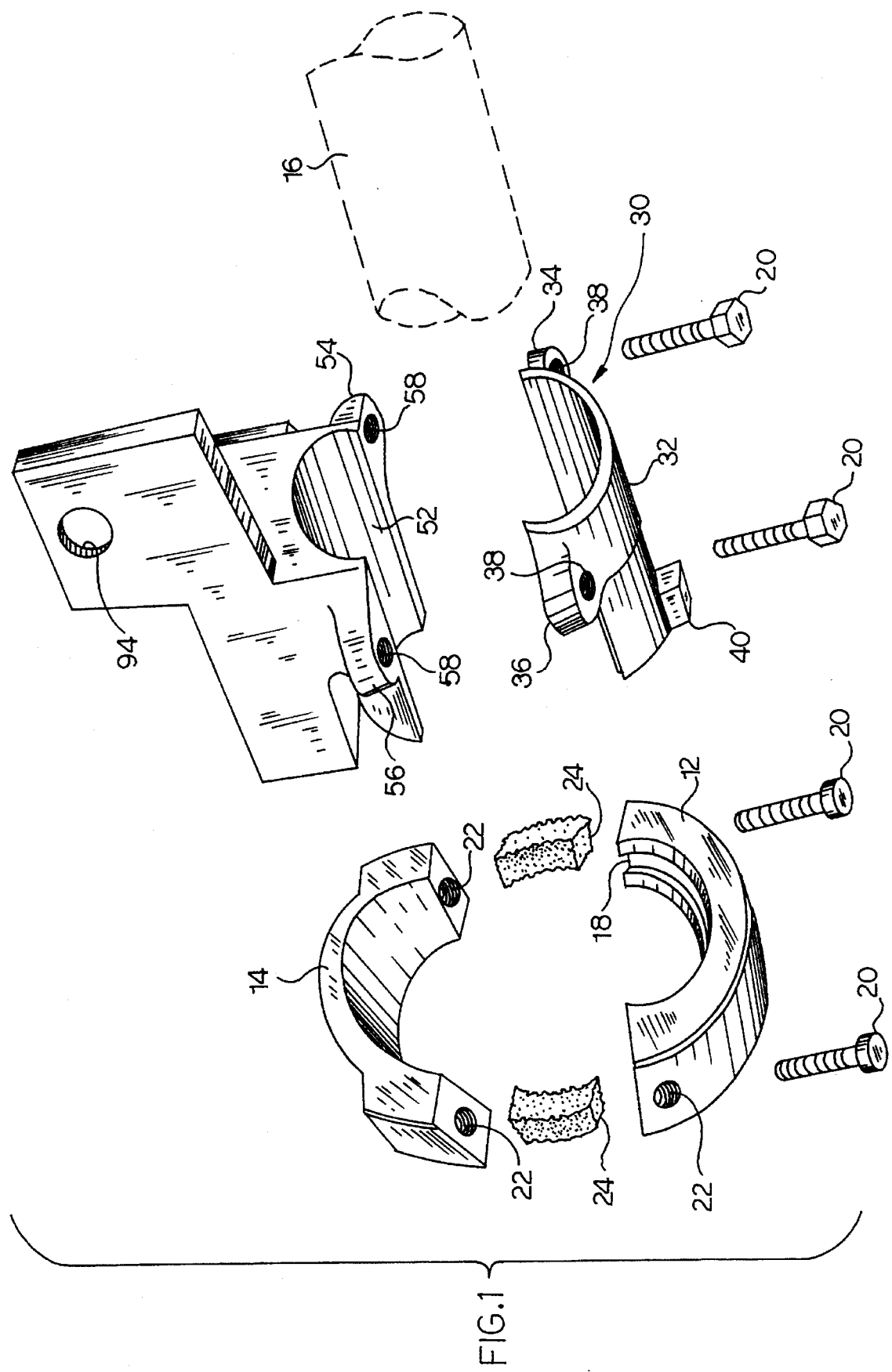
FIG. 1 is an exploded view of a control lever connector assembly constructed according to the present invention.

In the following description, like reference characters designate like or corresponding parts through the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing the preferred embodiment and are not intended to limit the invention thereto. As best seen in FIG. 1, there is shown an exploded view of a control lever connector assembly constructed according to the present invention.

The connector assembly includes (1) a pair of complementary circumferential clamping members 12 and 14 which, when assembled, surround section of the handlebar 16 and (2) a mounting bracket 30. A pair of resilient spring-like nylon strips 24 are received in an arcuate internal semi-circular groove 18 in clamping member 12. A pair of threaded fasteners 20 pass through apertures 22 and join the clamping members 12, 14 together in clamping relationship.

The mounting bracket 30 includes a semi-tubular member 32 which is so sized and shaped as to fit around handlebar 16. A pair of bosses 34, 36 are provided at one end of bracket member 32 and include threaded openings 38 therein. The mounting bracket 30 also includes an opposite semi-tubular bracket member 52 that includes bosses 54, 56 with threaded openings 58 therein that mate with the bosses 34, 36 of bracket member 32 and retain bracket members 32, 52 loosely around handlebar 16. At the opposite end of bracket member 32, a lug 40 extends radially outwardly thereof. When assembled, lug 40 is received within groove 18 in clamping member 12 in such a manner that mounting bracket 30 is free to pivot to a limited extent around the longitudinal axis of handlebar 16.

Figure 2:
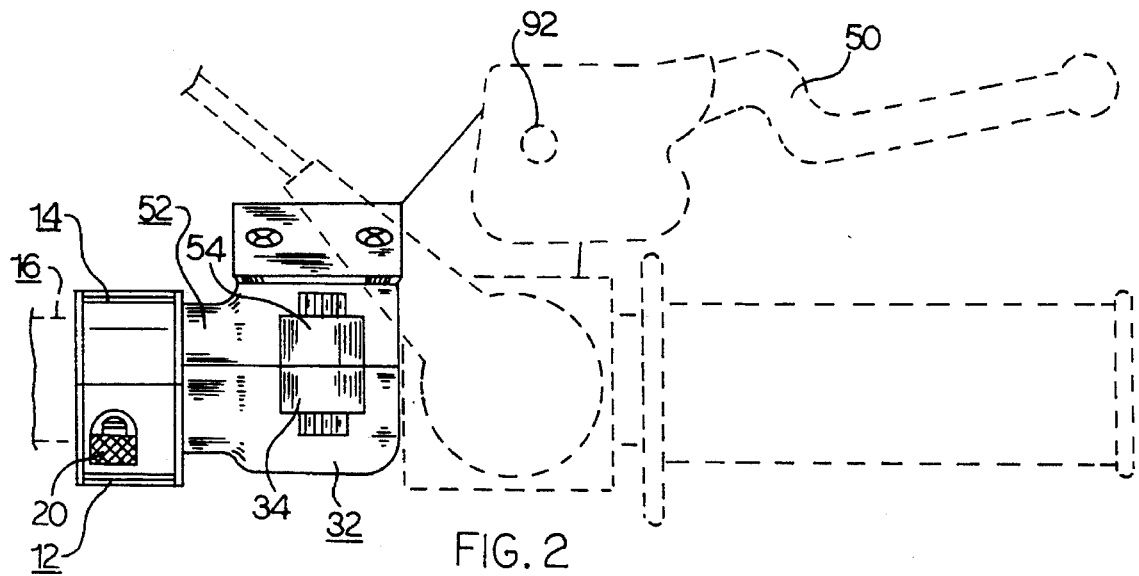
FIG. 2 is a side elevational view of the control lever connector assembly shown in FIG. 1.
Figure 3:
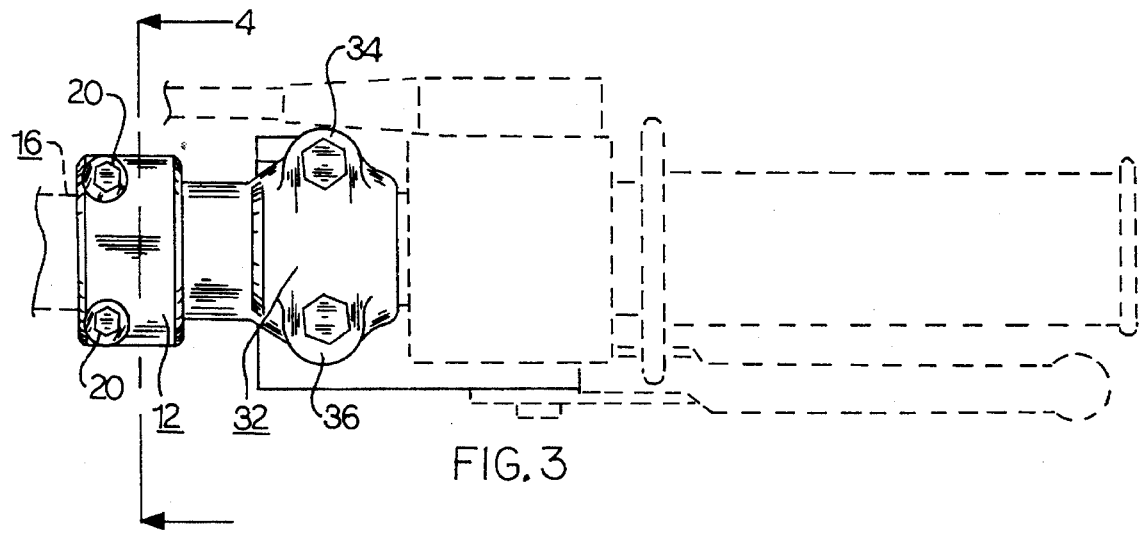
FIG. 3 is a bottom plan view of the control lever connector assembly.
Figure 4:
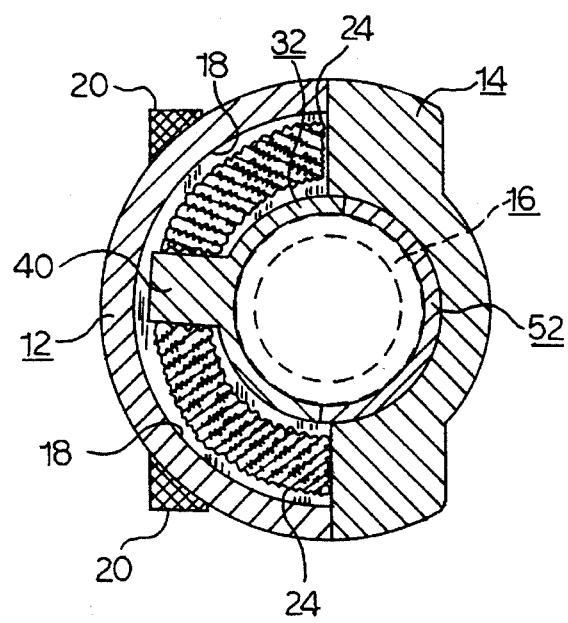
FIG. 4 is an enlarged cross-sectional view of the control lever connector assembly taken along line 4—4 of FIG. 3 showing the mounting bracket in its initial or normal position, in which none of the springs are compressed.

Turning now to FIG. 2, there is shown a side elevational view of the control lever connector assembly shown in FIG. 1. As can be seen, tubular member 52 is sized to permit the attachment of a control lever 50 which can be a conventional clutch lever (shown by dotted lines) attached to the bracket 30 by, for example, a pivot pin 92 inserted through pin hole 94 on bracket 30 (shown in FIG. 1). As best seen in FIG. 3, there is shown a bottom plan view of the control lever connector assembly shown in FIG. 2. Finally, as shown in FIG. 4, there is an enlarged cross-sectional view of the control lever connector assembly shown in FIG. 3 taken along line 4—4.

Figure 5:
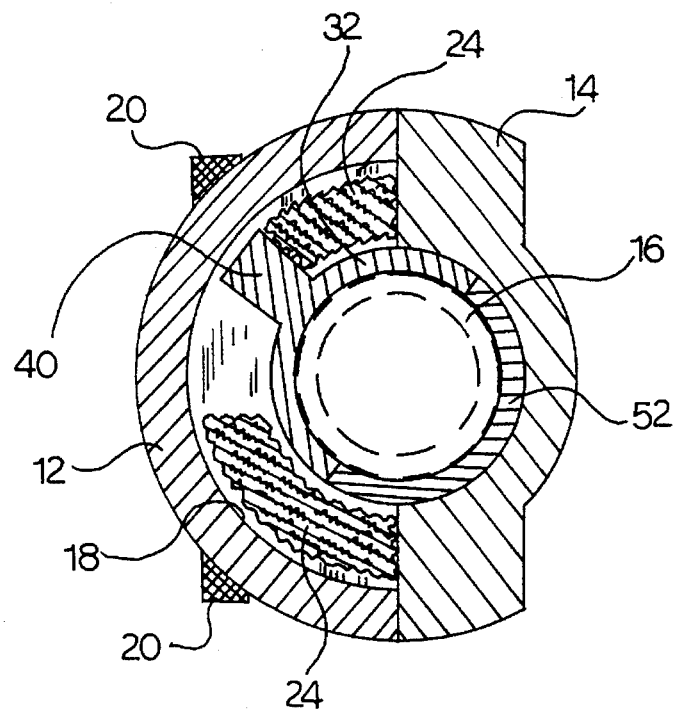
FIG. 5 is an enlarged cross-sectional view of the control lever connector assembly showing the mounting bracket in its rotated position, in which one of the two springs is compressed.
Figure 6:
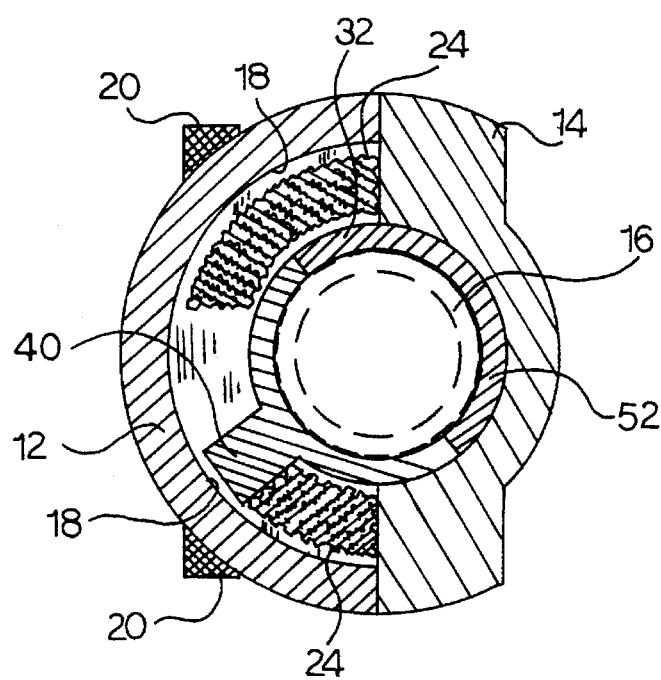
FIG. 6 is an enlarged cross-sectional view of the control lever connector assembly showing the mounting bracket rotated in the other position, in which the other spring is compressed.

As can be seen, the pair of opposed nylon springs 24 are located in groove 18 on either side of lug 40 such that springs 24 are not compressed. Also shown in FIG. 5 is an enlarged cross-sectional view of the control lever connector assembly showing the mounting bracket 30 in its rotated position, in which the lug 40 is compressing one of the two springs 24. FIG. 6 is an enlarged cross-sectional view of the control lever connector assembly showing the mounting bracket 30 rotated in the other position, in which the lug 40 is compressing the other spring 24.

In operation, natural stresses and forces on the hands of the rider which occur during operation of the motorcycle (as in jumping or cross-country rides) tend to pivotally bias the control lever in one direction or the other. The connector assembly of the present invention allows the control lever and hand of the operator to pivot responsive thereto. When the stress or force is removed, the springs 24 cause the control lever to return to the normal position. Thus rotation of the lever in one direction compresses one of the pair of springs 24 while releasing the preload against the other spring. Conversely, rotation in the opposite direction compresses the other connector of the springs by releasing the first. As a result, the connector permits axial movement over a limited range during activities such as jumping while at the same time returning to the control lever to its initial position when released.

Certain modifications and improvements will occur to those skilled in the art upon reading of the foregoing description. By way of example, the amount of included arc of lug 40 can be varied to control the degree of axial rotation. Also, different spring lengths in groove 18 would limit axial rotation in each direction to different amounts since longer springs would allow more compression. It should be understood that all such modifications and improvements have been deleted herein for the sake of conciseness and readability but are properly within the scope of the following claims.

I claim:

1. A combination of a connector and a motorcycle having a hand control lever and a handlebar, wherein the connector comprises:

a. a split mounting bracket having a tubular portion surrounding said handlebar, said control lever attached to the bracket;

b. a pair of complementary circumferential clamping members clamped around said handlebar, at least one of the clamping members having an arcuate internal semi-circular groove;

c. a lug extending radially from one end of said bracket; and d. at least one spring member placed within said groove between said lug and one end of said groove, where the at least one spring member is compressed when said control lever is rotated about said handlebar under a rotational force, and can return said mounting bracket to its initial position when said control lever is no longer subject to said rotational force.

2. The combination according to claim 1 wherein said at least one spring member is a strip of nylon material having a sinusoidal-shaped longitudinal cross-section.

3. The combination according to claim 1 further comprising an additional spring member placed within said groove between said lug and another end of said groove, where the spring member is compressed when said control lever is rotated about said handlebar under a rotational force, and can return said mounting bracket to its initial position when said control lever is no longer subject to said rotational force, thereby providing limited bi-direction axial rotation for said control lever.

4. The combination according to claim 3 wherein said additional spring member is a strip of nylon material having a sinusoidal-shaped longitudinal cross-section.

5. A combination of a connector and a motorcycle having a hand control lever and a handlebar, wherein the connector comprises:

a. a mounting bracket rotatably attached on said handlebar, said control lever externally attached to the bracket;

b. a clamping member clamped on said handlebar; and c. a radially extended lug of said bracket rotatably engaged with an internal groove of said clamping member through at least one spring member placed therebetween, where the at least one spring member is compressed when said control lever is rotated about said handlebar under a rotational force and can return said mounting bracket to its initial position when said control lever is no longer subject to said rotational force.

6. The combination according to claim 5 wherein said at least one spring member is a strip of nylon material.

7. The combination according to claim 5 further comprising an additional spring member placed within said groove between said lug and another end of said groove, where the spring member is compressed when said control lever is rotated about said handlebar under a rotational force and can return said mounting bracket to its initial position when said control lever is no longer subject to said rotational force, thereby providing limited bi-direction axial rotation for said control lever.

8. The combination according to claim 7 wherein said additional spring member is a strip of nylon material having a sinusoidal-shaped longitudinal cross-section.

* * * * *